US006428914B2

(12) United States Patent
Nagano et al.

(10) Patent No.: US 6,428,914 B2
(45) Date of Patent: Aug. 6, 2002

(54) COMPOSITE SUBSTRATE, THIN-FILM ELECTROLUMINESCENT DEVICE USING THE SUBSTRATE, AND PRODUCTION PROCESS FOR THE DEVICE

(75) Inventors: Katsuto Nagano; Taku Takeishi; Suguru Takayama; Takeshi Nomura; Yukie Nakano; Daisuke Iwanaga, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/730,855

(22) Filed: Dec. 7, 2000

Related U.S. Application Data

(63) Continuation of application No. PCT/JP00/02232, filed on Apr. 6, 2000.

(30) Foreign Application Priority Data

Apr. 7, 1999 (JP) ........................................... 11-099994
Mar. 3, 2000 (JP) ........................................... 2000-59533

(51) Int. Cl.[7] ................................................ B32B 15/00
(52) U.S. Cl. ........................ 428/917; 428/697; 428/469
(58) Field of Search ................................ 428/469, 697, 428/689, 917, 432; 313/506, 509, 512

(56) References Cited

U.S. PATENT DOCUMENTS

| | | | | | |
|---|---|---|---|---|---|
| 4,757,235 A | * | 7/1988 | Numomura et al. | ........ | 428/432 |
| 5,043,631 A | * | 8/1991 | Kun et al. | ............... | 315/169.3 |
| 5,107,174 A | * | 4/1992 | Galluzzi et al. | ............ | 313/503 |
| 5,756,147 A | | 5/1998 | Xingwei et al. | | |

FOREIGN PATENT DOCUMENTS

| | | |
|---|---|---|
| EP | WO 00/62582 | 10/2000 |
| JP | A JP 60133692 | 7/1985 |
| JP | 62-278791 | 3/1987 |
| JP | 62-278792 | 12/1987 |
| JP | 63-69193 | 3/1988 |
| JP | 64-63297 | 3/1989 |
| JP | A 2044691 | 2/1990 |
| JP | A JP4305996 | 10/1992 |
| JP | A 06-084692 | 3/1994 |
| JP | 7-50197 | 2/1995 |
| JP | 7-44072 | 5/1995 |
| JP | A 7283006 | 10/1995 |
| JP | A 9035869 | 2/1997 |
| WO | WO 93/23972 | 11/1993 |

OTHER PUBLICATIONS

"Electro–luminescent Display", Jul. 25, 1991 Author: Toshio Inoguchi (Non–English).

* cited by examiner

*Primary Examiner*—Deborah Jones
*Assistant Examiner*—Gwendolyn Blackwell-Rudasill
(74) *Attorney, Agent, or Firm*—Oblon, Spivak, McClelland, Maier & Neustadt, P.C.

(57) ABSTRACT

A composite substrate in which the surface of the insulating layer is not influenced by the electrode layer and which requires neither a grinding process nor a sol-gel process, is easy to produce and can provide a thin-film EL device having a high display quality when used therein; a thin-film EL device using the substrate; and a production process for the device. The thin-film EL device is produced by forming a luminescent layer, other insulating layer and other electrode layer successively on a composite substrate comprising a substrate; an electrode layer embedded in the substrate in such a manner that the electrode layer and the substrate are in one plane; and an insulating layer formed on the surface of a composite comprising the substrate and the electrode layer.

26 Claims, 3 Drawing Sheets

COMPOSITE SUBSTRATE, THIN-FILM ELECTROLUMINESCENT DEVICE USING THE SUBSTRATE, AND PRODUCTION PROCESS FOR THE DEVICE

CROSS-REFERENCE TO RELATED APPLICATION

This application is a continuation of International Application No. PCT/JP00/02232 filed Apr. 06, 2000, and Japanese Application Nos. 11-099994 filed Apr. 07, 1999, and 2000-59533 filed Mar. 03, 2000, and the entire content of both applications are hereby incorporated by reference.

BACKGROUND OF THE INVENTION

1. Field of the Invention

The present invention relates to a composite substrate containing a dielectric and an electrode, an electroluminescent (EL) device using the substrate, and a production process for the device.

2. Discussion of the Background

Electroluminescence is a phenomenon whereby a material emits light with the application of an electric field. Such a material is called electroluminescent (EL), and devices wherein this phenomenon is utilized have been put to practical use in liquid crystal displays (LCD) and back lights of watches.

EL devices are classified into two categories of a dispersion-type device and a thin-film device. The former has a structure in which a fluorescent material powder is dispersed in an organic material or an enamel and electrodes are disposed at top and bottom portions, and the latter contains a thin-film fluorescent material sandwiched between two electrodes and two thin-film insulators on an electrical insulating substrate. In addition, according to the type of driving system, each of the above two types of device is further classified into a direct-voltage drive system and an alternating-voltage drive system. The dispersion-type EL device has been known for a long time, and it has the advantage of facile preparation. However, the dispersion-type EL device has a low brightness and a short life, so that its utilization is limited. On the other hand, the thin-film EL device has a high brightness and a long life, and has, consequently, greatly expanded the practical application range of the EL device.

Heretofore, in the main type of thin-film EL device, a blue glass sheet for use in an LCD or a PDP is used as a substrate, transparent electrodes, such as ITO, are used as electrodes contacting the substrate, and light emitted from a fluorescent material is taken out from the side of the substrate. As the fluorescent material, Mn-containing ZnS capable of emitting yellowish orange light has been mainly used because it facilitates the formation of a film and has good light-emission properties. In order to fabricate a color display, it is essential to use fluorescent materials capable of emitting the primary colors of light, i.e., red, green and blue. As such materials, Ce-containing SrS and Tm-containing ZnS are selected for blue emission, Sm-containing ZnS and Eu-containing CaS are selected for red emission, and Tb-containing ZnS and Ce-containing CaS are selected for green light emission, and research on these materials continues. Unfortunately, since they are insufficient in brightness, luminous efficiency and color purity, they have not been put to practical use.

In an effort to address these problems, it is considered that a process of forming a film at high temperature or heat treatment of a formed film at a high temperature is promising. However, when such a technique is used, it is impossible to use a blue glass plate as the substrate from the viewpoint of heat resistance. Although the use of a quartz substrate having heat resistance has also been investigated, the quartz substrate is very expensive, and, therefore, it is not suitable for an application, such as a display which requires a large area.

As disclosed in Japanese Patent Application Laid Open No. 50197/1995 and Japanese Patent Publication No. 44072/1995, there has recently been reported the development of a device in which a ceramic substrate having electrical insulation properties is used as a substrate and a thick-film dielectric is substituted for the thin-film insulator located at the lower portion of a fluorescent material.

The basic structure of this device is shown in FIG. 8. The EL device shown in FIG. 8 has a structure in which a lower electrode 12, a thick-film dielectric layer 13, a luminescent layer 14, a thin-film insulator layer 15 and an upper electrode 16 are successively formed on a substrate 11 made of ceramic or the like. Accordingly, in contrast to the structure of the conventional thin-film EL device, a transparent electrode is placed at the top portion in order to take out light of the fluorescent material from the top portion opposite to the substrate.

The thick-film dielectric layer of this device has a thickness of several tens micrometers, which is several hundreds to several thousands times as much as that of the thin-film insulator layer. Therefore, the breakage of the insulator caused by pinholes or the like can be inhibited. Thus, the above device has the advantage that a high reliability and a high yield at the time of production can be obtained.

Voltage drop across the luminescent layer caused by the use of a thick dielectric can be prevented by forming the dielectric layer from a material having a high dielectric constant. Further, the rise of a heat treatment temperature can be allowed by using the ceramic substrate and the thick-film dielectric. As a result, the film formation of a highly luminous material, which has heretofore been impossible owing to the presence of defective crystals, is made possible.

However, when the substrate, the electrode and the dielectric layer are to be laminated by a thick-film forming process, the surface of the dielectric layer becomes inconveniently uneven in some cases.

In the conventional process, a substrate/electrode/dielectric layer composite substrate is obtained by first forming the electrode on the substrate of alumina or the like in a predetermined pattern by a thick-film forming process such as a print process, forming the dielectric layer on the electrode by the thick-film forming process, and then sintering the whole laminate obtained.

However, as shown in FIG. 9, for example, there has been a concern that the surface of the dielectric layer 13 may be uneven owing to the differences in shrinkage ratios and thermal expansion coefficients between the electrode layer 12 and the dielectric layer 13 when the electrode layer 12 is formed in a predetermined pattern. Furthermore, the surface of the dielectric layer 13 is cracked in some cases owing to the difference in thermal expansion coefficients between the substrate 11 and the dielectric layer 13. Thus, when the dielectric layer 13 has an uneven or cracked surface, the thickness of the dielectric layer 13 becomes non-uniform, or a peeling phenomenon occurs between the dielectric layer 13 and the luminescent layer formed thereon, whereby the performance and the display quality of the device are remarkably impaired.

Therefore, in the conventional process, it is necessary to remove large uneven portions by grinding, for example, and fine uneven portions by a sol-gel process.

SUMMARY OF THE INVENTION

Accordingly, it is an object of the present invention is to provide a composite substrate in which the surface of an insulating layer does not become uneven by the influence of an electrode layer and which requires neither a grinding process nor a sol-gel process, is easy to produce, and can provide a thin-film EL device having a high display quality when applied thereto.

It is another object of the present invention is to provide a thin-film EL device using the above substrate.

It is yet another object of the present invention is to provide a production process for the above device.

The above objects of the present invention are achieved by the following composite substrates, devices and processes.

(1) A composite substrate containing a substrate; an electrode layer embedded in the substrate in such a manner that the electrode layer and the substrate are in one plane: and an insulating layer formed on the surface of a composite of the substrate and the electrode layer.

(2) A composite substrate according to the above (1), wherein the insulating layer contains a dielectric having a dielectric constant of 1000 or more.

(3) A composite substrate according to the above (1) or (2), wherein the insulating layer contains barium titanate as a main component.

(4) A composite substrate according to the above (3), wherein the insulating layer contains, as a secondary component, at least one selected from the group consisting of magnesium oxide, manganese oxide, tungsten oxide, calcium oxide, zirconium oxide, niobium oxide, cobalt oxide, yttrium oxide and barium oxide.

(5) A composite substrate according to the above (3) or (4), wherein the insulating layer contains, as a secondary component, at least one selected from the group consisting of $SiO_2$, MO, and $B_2O_3$, wherein M is at least one element of Mg, Ca, Sr and/or Ba.

(6) A composite substrate according to any one of the above (1) to (5), wherein the insulating layer contains barium titanate as a main component and at least one selected from the group consisting of magnesium oxide, manganese oxide, yttrium oxide, barium oxide and calcium oxide, and silicon oxide as secondary components; and the content of magnesium oxide in terms of MgO is 0.1 to 3 moles, that of manganese oxide in terms of MnO is 0.05 to 1.0 mole, that of yttrium oxide in terms of $Y_2O_3$ is not more than 1 mole, that of barium oxide in terms of BaO and calcium oxide in terms of CaO is 2 to 12 moles, and that of silicon oxide in terms of $SiO_2$ is 2 to 12 moles, based on 100 moles of barium titanate in terms of $BaTiO_3$.

(7) A composite substrate according to the above (3), wherein the total content of BaO, CaO and $SiO_2$ in terms of $(Ba_xCa_{1-x}O)_y \cdot SiO_2$ (provided that x satisfies $0.3 \leqq x \leqq 0.7$ and y satisfies $0.95 \leqq y \leqq 1.05$) is 1 to 10 wt % based on the total content of $BaTiO_3$, MgO, MnO and $Y_2O_3$.

(8) A composite substrate according to any one of the above (1) to (7), which is a thick film obtained by sintering the laminate formed by the use of a sheet-forming process or a print process.

(9) A composite substrate according to any one of the above (1) to (8), which is obtained by forming a functional film on the insulating layer containing at least one selected from the group consisting of Ag, Au, Pd, Pt, Cu, Ni, W, Mo, Fe and Co, or any one of Ag-Pd, Ni-Mn, Ni-Cr, Ni-Co and Ni-Al alloys; and then heating the functional film at a temperature of from 600° C. to a sintering temperature of the substrate or less.

(11) A thin film EL device according to the above (10), wherein the electrode layer contains at least one element of Ag, Au, Pd, Pt, Cu, Ni, W, Mo, Fe and/or Co; or at least one alloy of Ag—Pd, Ni—Mn, Ni—Cr, Ni—Co and/or Ni—Al alloys.

(12) A process for producing a thin film EL device entailing:

forming a first insulating layer precursor on a film sheet having a flat surface by a thick-film production process;

forming a first patterned electrode layer precursor thereon;

forming a substrate precursor thereon, subjecting the laminate to a binder-removing treatment and sintering it to obtain a composite substrate having the first electrode layer and the first insulating layer formed on the substrate; and further laminating a luminescent layer, a second insulating layer and a second electrode layer on the first insulating layer successively to obtain the thin-film EL device.

(13) A process for producing the thin film EL device according to the above (12), wherein a heat treatment is carried out at a temperature of from 600° C. to a sintering temperature of the substrate or less, after the formation of the second insulating layer or the second electrode layer.

(14) A process for producing the thin film EL device according to the above (12) or (13), wherein the substrate precursor is a substrate green sheet which contains at least one selected from the group consisting of alumina ($Al_2O_3$), silica glass ($SiO_2$), magnesia (MgO), steatite ($MgO \cdot SiO_2$), forsterite (2MgO, $SiO_2$), mullite ($3Al_2O_3 \cdot 2SiO_2$), beryllia (BeO), zircon, and Ba-, Sr- and Pb-based perovskites.

(15) A process for producing the thin film EL device according to any one of the above (12) to (14), wherein the composition of the main component of the substrate precursor is the same as that of the insulating layer.

(16) A process for producing the thin film EL device according to any one of the above (12) to (15), wherein the electrode layer precursor comprises at least one selected from the group consisting of Ag, Au, Pd, Pt, Cu, Ni, W, Mo, Fe and Co, or any one of Ag—Pd, Ni—Mn, Ni—Cr, Ni—Co and Ni—Al alloys.

(17) A process for producing the thin film EL device according to any one of the above (12) to (16), wherein the sintering temperature is in a range of 1,100 to 1,400° C.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
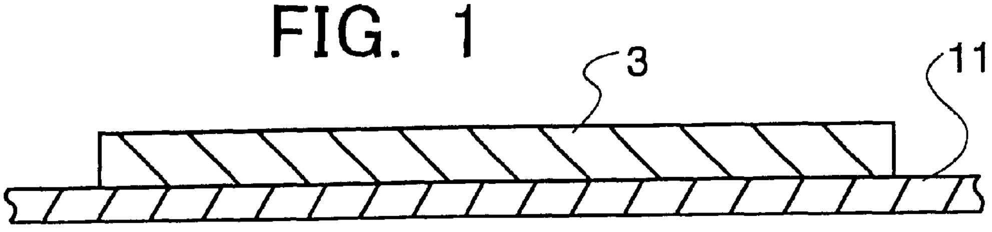
FIG. 1 is an illustration of a partial section of the production process of the thin-film EL device of the present invention.

The present invention provides a composite substrate which contains a substrate; an electrode layer embedded in the substrate in such a manner that the electrode layer and the substrate are in one plane; and an insulating layer formed on the surface of a composite of the substrate and the electrode layer.

In this way, the electrode layer is formed so as to be embedded in the substrate and so that the surface of the embedded electrode layer and that of the substrate may be flat in one plane, whereby the thickness of the insulating layer (dielectric layer) can be uniformed. In addition, the thickness of the dielectric layer is uniformed, whereby the distribution of electric field in the dielectric layer can be uniformed, with the result that the distortion of the dielectric layer can be reduced.

Moreover, the thin-film EL device is constituted by the use of the above composite substrate, whereby a high-performance display can be formed by a simple process. In this connection, the composite substrate having the flat surface can be easily formed by the production process of the present invention that will be described later.

The substrate of the present invention has insulation properties, does not contaminate an insulating layer (dielectric layer) and an electrode layer formed thereon, and is not particularly limited as long as it is capable of maintaining a predetermined strength. Typical examples of the substrate include ceramic substrates such as alumina ($Al_2O_3$), silica glass ($SiO_2$), magnesia (MgO), forsterite ($2MgO \cdot SiO_2$), steatite ($MgO \cdot SiO_2$), mullite ($3Al_2O_3 \cdot 2SiO_2$), beryllia (BeO), zirconia ($ZrO_2$), aluminum nitride (AlN), silicon nitride (SiN) and silicon carbonate (SiC+BeO). In addition, Ba-, Sr- and Pb-based perovskites may also be used, and in this case, the same composition as used for the insulating layer may be used. Of these compounds, the alumina substrate is particularly preferable, and when thermal conductivity is required, beryllia, aluminum nitride, silicon carbonate and the like are preferable. It is preferable to form the substrate using the same composition as used for the insulating layer, because in such case, a phenomenon such as warping or peeling due to different thermal expansions does not occur.

The sintering temperature of the substrate is 800° C. or higher, preferably 800° C. to 1,500° C., more preferably 1,200° C. to 1,400° C.

The substrate may contain a glass material for the purpose of, for example, lowering the sintering temperature. Typical examples of the glass material include PbO, $B_2O_3$, $SiO_2$, CaO, MgO, $TiO_2$ and $ZrO_2$, and they may be used alone or in combination of two or more thereof. The content of the glass material is in a range of about 20 to 30 wt % based on the substrate material.

In preparing a paste for the substrate, an organic binder may be used. The organic binder is not particularly limited, and it may be suitably selected from those which are generally used as the binder for ceramics. Examples of such an organic binder include ethyl cellulose, acryl resins and butyral resins, and examples of a solvent include α-terpineol, butyl carbinol and kerosene. The contents of the organic binder and the solvent in the paste are not particularly limited, and they may be the same as generally used. For example, the content of the binder is in a range of about 1 to 5 wt %, and that of the solvent is in a range of about 10 to 50 wt %.

Furthermore, the paste for the substrate may also contain additives such as a dispersing agent, a plasticizer and an insulator as required. The total content of these additives is preferably 1 wt % or less.

The thickness of the substrate is generally in a range of about 1 to 5 mm, preferably about 1 to 3 mm.

The electrode material used herein should preferably contain one or two or more of Ag, Au, Pd, Pt, Cu, Ni, W, Mo, Fe and Co or any one of Ag—Pd, Ni—Mn, Ni—Cr, Ni—Co and Ni—Al alloys. When firing is carried out in a reducing atmosphere, base metals may be selected from these materials. Materials containing one or two or more of Mn, Fe, Co, Ni, Cu, Si, W, Mo, etc. or any one of Ni—Cu, Ni—Mn, Ni—Cr, Ni—Co and Ni—Al alloys are more preferable, with Ni, Cu, and Ni—Cu alloys, etc. being most preferred.

When the sintering is carried out under an oxidizing atmosphere, a metal which does not become an oxide under the oxidizing atmosphere is preferable. Typical examples of the metal include Ag, Au, Pt, Rh, Ru, Ir and Pd, and they may be used alone or in a combination of two or more thereof. Particularly preferable examples thereof include Ag, Pd, and an Ag—Pd alloy.

The electrode layer may contain a glass frit to enhance its adhesion to the substrate which is an underlayer of the electrode layer itself. The glass frit is preferably such as not to lose the characteristic properties of glass, even when the sintering is carried out in a neutral or a reducing atmosphere.

The composition of the glass frit is not particularly limited, as long as it satisfies the above requirements. Examples of the glass frit include silicate glass ($SiO_2$: 20 to 80 wt %, $Na_2O$: 80 to 20 wt %), borosilicate glass ($B_2O_3$: 5 to 50 wt %, $SiO_2$: 5 to 70 wt %, PbO: 1 to 10 wt %, $K_2O$: 1 to 15 wt %) and alumina silicate glass ($Al_2O_3$: 1 to 30 wt %, $SiO_2$: 10 to 60 wt %, $Na_2O$: 5 to 15 wt %, CaO: 1 to 20 wt %, $B_2O_3$: 5 to 30 wt %) , and they can be used singly or in a combination of two or more thereof. If necessary, the glass frit may be mixed with at least one additive selected from the group consisting of CaO (0.01 to 50 wt %), SrO (0.01 to 70 wt %), BaO (0.01 to 50 wt %), MgO (0.01 to 5 wt %), ZnO (0.01 to 70 wt %), PbO (0.01 to 5 wt %), $Na_2O$ (0.01 to 10 wt %), $K_2O$ (0.01 to 10 wt %) and $MnO_2$ (0.01 to 20 wt %) in a predetermined ratio. Although the content of the glass is not particularly limited, it is usually in a range of about 0.5 to 20 wt %, preferably about 1 to 10 wt % based on the metal component. Furthermore, the total content of the above additives in the glass is preferably 50 wt % or less of the glass component.

In preparing a paste for the electrode layer, an organic binder may be used. Examples of the organic binder are the same as in the case of the above substrate. Further, the paste for the electrode layer may also contain additives such as dispersant, a plasticizer and an insulator as required. The total content of these additives is preferably 1 wt % or less.

The thickness of the electrode layer is usually in a range of about 0.5 to 5 μm, preferably about 1 to 3 μm.

An insulating material which constitutes the insulating layer is not particularly limited, and various kinds of insulating materials can be used. Preferable examples thereof include composite titanium oxides, titanium-based composite oxides and mixtures of these oxides.

An example of the composite titanium oxides is titanium oxide ($TiO_2$) containing, as required, any of nickel oxide (NiO), copper oxide (CuO), manganese oxide ($Mn_3O_4$), alumina ($Al_2O_3$), magnesium oxide (MgO), silicon oxide ($SiO_2$) and the like in a total content of 0.001 to 30 wt %; and an example of the titanium-based composite oxides is barium titanate ($BaTiO_3$). The atomic ratio of Ba/Ti in barium titanate is preferably in a range of about 0.95 to 1.20.

The titanium-based composite oxide ($BaTiO_3$) may contain at least one selected from the group consisting of magnesium oxide (MgO), manganese oxide ($Mn_3O_4$), tungsten oxide ($WO_3$), calcium oxide (CaO), zirconium oxide ($ZrO_2$), niobium oxide ($Nb_2O_5$), cobalt oxide ($Co_3O_4$), yttrium oxide ($Y_2O_3$) and barium oxide (BaO) in a total amount of about 0.001 to 30 wt %. Furthermore, for the purpose of, for example, adjusting a sintering temperature and an expansion coefficient, the insulating layer may contain at least one selected from the group consisting of $SiO_2$, MO (provided that M is at least one element selected from Mg, Ca, Sr and Ba), $Li_2O$ and $B_2O_3$ as a secondary component. The thickness of the insulating layer is not particularly limited, but it is usually in a range of 5 to 1,000 μm, preferably 5 to 50 μm, more preferably about 10 to 50 μm.

The insulating layer may be formed of a dielectric material. Especially in the case that the composite substrate is applied to the thin-film EL device, the dielectric material is preferable. The dielectric material is not particularly limited, and any dielectric material can be used. Preferable examples of the dielectric material include composite titanium oxides, titanium-based composite oxides, and mixtures thereof as mentioned above.

Examples of the titanium-based composite oxides are the same as enumerated above. Furthermore, for the purpose of, for example, adjusting the sintering temperature and the expansion coefficient, the insulating layer may contain at least one selected from the group consisting of $SiO_2$, MO (provided that M is at least one element selected from Mg, Ca, Sr and Ba), $Li_2O$ and $B_2O_3$, as a secondary component.

The particularly preferable dielectric materials are as follows. The dielectric layer (insulating layer) contains barium titanate as a main component and at least one selected from the group consisting of magnesium oxide, manganese oxide, barium oxide and calcium oxide, and silicon oxide as secondary components. In the dielectric layer, the content of the magnesium oxide in terms of MgO is 0.1 to 3 moles, preferably 0.5 to 1.5 moles, the content of the manganese oxide in terms of MnO is 0.05 to 1.0 mole, preferably 0.2 to 0.4 moles, the total content of the barium oxide in terms of BaO and the calcium oxide in terms of CaO is 2 to 12 moles, and the content of the silicon oxide in terms of $SiO_2$ is 2 to 12 moles, based on 100 moles of the barium titanate in terms of $BaTiO_3$.

The ratio of $(BaO+CaO)/SiO_2$ is not particularly limited but is usually preferably in a range of 0.9 to 1.1. BaO, CaO and $SiO_2$ may be contained as $(Ba_xCa_{1-x}O)_y \cdot SiO_2$. In this case, x and y preferably satisfy $0.3 \leqq x \leqq 0.7$ and $0.95 \leqq y \leqq 1.05$, respectively, to obtain a dense sinter. The content of $(Ba_xCa_{1-x}O)_y \cdot SiO_2$ is preferably in a range of 1 to 10 wt %, more preferably 4 to 6 wt %, based on the total weight of $BaTiO_3$, MgO and MnO. The oxidation state of each of the oxides is not particularly limited, as long as the content of the metal element constituting each oxide is within the above range.

The dielectric layer preferably contains yttrium oxide as a secondary component in an amount of 1 mole or less in terms of $Y_2O_3$ based on 100 moles of barium titanate in terms of $BaTiO_3$. The lower limit of the $Y_2O_3$ content is not particularly determined but is preferably at least 0.1 mole in order to achieve a sufficient effect. When yttrium oxide is contained, the content of $(Ba_xCa_{1-x}O)_y \cdot SiO_2$ is preferably in a range of 1 to 10 wt %, more preferably 4 to 6 wt %, based on the total content of $BaTiO_3$, MgO, MnO and $Y_2O_3$.

The contents of the above secondary components are limited because of the following reasons.

When the content of magnesium oxide is below the above range, the temperature characteristics of capacitance can not be within a desired range. When the content of magnesium oxide is above the above range, the degree of the sintering of the dielectric layer sharply lowers and the layer is poorly densified. Consequently, IR accelerated life is reduced and a high dielectric constant cannot be obtained.

When the content of manganese oxide is below the above range, good anti-reduction properties cannot be obtained, IR accelerated life is not sufficient, and it is difficult to reduce loss tan δ. When the content of manganese oxide is above the aforesaid range, it is difficult to reduce the change of the capacitance with time at the time of applying a DC electric field.

When the content of BaO+CaO, $SiO_2$ or $(Ba_xCa_{1-x}O)_y \cdot SiO_2$ is too low, the change of the capacitance with time at the application of the DC electric field increases, and the IR accelerated life is not sufficient. When this content is too high, the dielectric constant sharply decreases.

Yttrium oxide has the effect of improving the IR accelerated life. When the content of yttrium oxide is above the aforesaid range, the capacitance decreases, and the degree of the sintering of the dielectric layer lowers, with the result that the layer is poorly densified in some cases.

The dielectric layer may also contain aluminum oxide. Aluminum oxide has the effect of making the sintering at relatively low temperatures possible. The content of aluminum oxide in terms of $Al_2O_3$ is preferably 1 wt % or less based on the total of all the dielectric materials. When the content of aluminum oxide is too high, the problem of inhibiting the sintering takes place.

The thickness of the dielectric layer is preferably 100 μm or less, more preferably 50 μm or less, particularly preferably 2 to 20 μm.

An organic binder may be used in preparing an insulating layer paste. Examples of the organic binder include the same as those listed for the substrate. Further, the insulating layer paste may also contain additives such as a dispersing agent, a plasticizer and an insulator as required. The total content of these additives is preferably 1 wt % or less.

The composite substrate of the present invention is produced by laminating an insulating layer precursor, an electrode layer precursor and a substrate precursor by a usual printing process or a sheet-forming process using the paste, and then sintering the resultant laminate.

The surface of the insulating layer (dielectric layer) can be flattened by first forming a green sheet for an insulating layer on a film sheet having a flat surface, forming the electrode layer precursor thereon, followed by the formation of the substrate precursor and sintering. In this case, since the thickness of the substrate is much larger than that of the insulating layer, the other surface of the substrate is not influenced by the electrode layer.

The film sheet having the flat surface is not particularly limited, and a usual resin film sheet can be used. Particularly preferable is a sheet with chemical resistance that facilitates the peeling of the green sheet.

Typical examples of the film sheet include polyethylene naphthalate (PEN) films, polyethylene terephthalate (PET) films, polyethylene naphthalate heat-resistant films; fluorine-based films of homopolymers such as polychlorotrifluoroethylene (PCTFE: Neoflon CTFE, a product of Daikin Industries, Ltd.), polyvinylidenefluoride (PVDF: Denka DX film, a product of Denki Kagaku Kogyou Co., Ltd.) and polyvinylfluoride (PVF: Tedora PVF film, a product of Du Pont Co., Ltd.) and copolymers such as tetrafluoroethylene-perfluorovinylether copolymer (PFA: Neoflon: PFA film, a product of Daikin Industries, Ltd.), tetrafluoroethylene-hexafluoropropylene copolymer (FEP: Toyoflon film FEP type, a product of Toray Industries, Inc.), tetrafluoroethylene-ethylene copolymer (ETFE: Tefzel ETFE film, a product of Du Pont Co., Ltd.; AFLEX film, a product of Asahi Glass Co., Ltd.); aromatic dicarboxylic acid-bisphenol copolymerized aromatic polyester polyacrylate films (PAR: Casting, Elmec manufactured by Kaneka Corporation), polymethylmethacrylate films (PMMA: Technolloy R526, a product of Sumitomo Chemical Co., Ltd.); sulfur-containing polymer films such as polysulfone (PSF: Smilite FS-1200, a product of Sumitomo Bakelite Co., Ltd.) and polyethersulfone (PES: Smilite FS-1300, a product of Sumitomo Bakelite Co., Ltd.); polycarbonate films (PC: Panlite, a product of Teijin Chemicals Ltd.); functional norbomene-based resins (ARTON, a product of JSR Corporation); polymethacrylate resins (PMMA); olefinmaleimide copolymers (TI-160, a product of Tosoh Corporation), paramide (Aramika R: a product of Asahi Chemical Industry Co., Ltd.), polyimide fluoride, polystyrene, polyvinyl chloride and cellulose triacetate. PEN films and PET films are particularly preferable.

A cellulose-containing sheet such as paper may also be used and subjected to the sintering together with the sheet.

The thickness of the film sheet is not particularly limited but is preferably in a range of 100 to 400 $\mu$m from the viewpoint of handling.

The conditions for the binder-removing treatment conducted before the sintering may be those that are usually used. When the sintering is carried out under a reducing atmosphere, the following conditions are preferable.

Heating rate: 5 to 500° C./h, preferably 10 to 400° C./h

Retention temperature: 200 to 400° C., preferably 250 to 300° C.

Temperature retention time: 0.5 to 24 hours, preferably 5 to 20 hours

Atmosphere: in the air

The atmosphere for the sintering may be suitably selected according to the types of conductive materials contained in the electrode layer paste. When the sintering is carried out under a reducing atmosphere, the sintering atmosphere preferably contains $N_2$ as a main component, 1 to 10% of $H_2$, and $H_2O$ gas which is obtained by vapor pressure at 10 to 35° C. The oxygen partial pressure is preferably $10^{-8}$ to $10^{-12}$ Torr. When the oxygen partial pressure is below the above range, the conductive materials used in the electrode layer cause the abnormal sintering, whereby the layer breaks in some cases. When the oxygen partial pressure is above the above range, the electrode layer is apt to be oxidized. When the sintering is carried out under an oxidizing atmosphere, it is carried out in the same manner as it is carried out in the air.

The retention temperature at the time of the sintering is preferably 800 to 1,400° C., more preferably 1,000 to 1,400° C., particularly preferably 1,200 to 1,400° C. When the retention temperature is below the above range, the electrode layer is poorly densified. When the retention temperature is above the above range, the electrode layer is liable to break. The temperature retention time at the time of the sintering is preferably 0.5 to 8 hours, particularly preferably 1 to 3 hours.

The composite substrate is preferably subjected to annealing after sintered in a reducing atmosphere. The annealing is a treatment for re-oxidizing the insulating layer, by which IR accelerated life can be remarkably extended.

The oxygen partial pressure in an annealing atmosphere is preferably $10^{-6}$ Torr or higher, particularly preferably $10^{-6}$ to $10^{-8}$ Torr. When the oxygen partial pressure is below the above range, the insulating layer or the dielectric layer cannot be re-oxidized easily. When it is above the above range, the internal electric conductor is liable to be oxidized.

The retention temperature at the time of the annealing is preferably 1,100° C. or less, more preferably 1,000 to 1,100° C. When the retention temperature is below the above range, the insulating layer or the dielectric layer is not sufficiently oxidized, thereby reducing the longevity of the composite substrate. When the retention temperature is above the above range, the electrode layer is oxidized, thereby reducing the current capacity. Further, the oxidized electrode layer reacts with the base materials of the insulating layer and the dielectric layer, thereby reducing the longevity of the composite substrate.

The annealing may be carried out only by increasing and decreasing temperature. In this case, the temperature retention time is zero and means the same as the maximum temperature. The temperature retention time is preferably 0 to 20 hours, particularly preferably 2 to 10 hours. As the atmospheric gas, for example, a humidified $H_2$ gas is preferable.

To humidify an $N_2$ gas, an $H_2$ gas or a mixed gas in the above steps of removing a binder, the sintering and the annealing, for example, a wetter may be used. In this case, water temperature is preferably 5 to 75° C.

The steps of removing a binder, the sintering and the annealing may be carried out successively or separately.

When the steps are carried out successively, they are preferably carried out as follows. After the binder-removing step, the atmosphere is changed without cooling the composite substrate, which is then sintered by increasing the temperature to the retention temperature for the sintering. The resulting composite substrate is then cooled and subjected to the annealing after the atmosphere is changed when the temperature reaches the retention temperature for the annealing.

When they are carried out separately, after the binder-removing step, the temperature is increased to a predetermined retention temperature, maintained at the retention temperature for a predetermined period of time, and then decreased to room temperature. In this case, the atmosphere for the binder-removing step is the same as that in the above sequential process. As for the annealing step, the temperature is increased to a predetermined retention temperature, maintained at the retention temperature for a predetermined period of time, and then decreased to room temperature. In this case, the atmosphere for the annealing step is the same as that in the above sequential process. Further, in the above sequential process, either the annealing step or the binder-removing step may be carried out separately.

The composite substrate can be obtained as described above.

The composite substrate of the present invention can be formed into a thin-film EL device by forming functional films such as a luminescent layer, other insulating layer and other electrode layer. Particularly, a thin-film EL device having good characteristic properties can be obtained by using dielectric materials in the insulating layer of the composite substrate of the present invention. Since the composite substrate of the present invention is made of sintering materials, it is suitable for use in a thin-film EL device obtained by forming a luminescent layer as a functional film on the substrate and subjecting the resulting substrate to heat treatment.

To obtain a thin-film EL device using the composite substrate of the present invention, a luminescent layer, other insulating layer and other electrode layer are formed on the insulating layer of the composite substrate in this order.

As materials for the luminescent layer, for example, those disclosed in the article. "The recent trends in developments of displays", by Shosaku Tanaka, Monthly Display, 1998, April, PP.1 to 10, may be used. Specific examples of the materials include ZnS and Mn/CdSSe for red emission, ZnS:TbOF and ZnS:Tb for green emission, and SrS:Ce, (SrS:Ce/ZnS)n, $Ca_2Ga_2S_4$:Ce and $Sr_2Ga_2S_4$:Ce for blue emission.

For white emission, for example, SrS:Ce/ZnS:Mn is known.

Above all, the application of the present invention to an EL device having a blue luminescent layer made of SrS:Ce, which is studied in the above IDW (International Display Workshop), 1997, X. Wu, "Multicolor Thin-Film Ceramic Hybrid EL Displays", PP. 593 to 596, gives particularly preferable results.

The thickness of the luminescent layer is not particularly limited. However, when it is too large, a driving voltage decreases, while when it is too small, luminous efficiency lowers. Specifically, though depending on luminous materials, it is preferably 100 to 1,000 nm, particularly preferably 150 to 500 nm.

The luminescent layer may be formed by a vapor deposition method. Illustrative examples of the vapor deposition method include a physical vapor deposition method such as sputtering or deposition and a chemical vapor deposition method such as CVD. Of these, the chemical vapor deposition method such as CVD is preferable.

Further, as is specifically described in the above IDW, when a luminescent layer made of SrS:Ce is formed by electron-beam deposition under an $H_2S$ atmosphere, a luminescent layer of high purity can be obtained.

The luminescent layer formed is preferably subjected to heat treatment. The heat treatment may be carried out from the substrate side after the electrode layer, the insulating layer and the luminescent layer are laminated or after the electrode layer, the insulating layer, the luminescent layer, the other insulating layer, and in some cases, the other electrode layer, are laminated, by cap annealing. It is preferable to carry out the heat treatment by the cap annealing. The heat treatment temperature is preferably 600° C. to the sintering temperature of the substrate, more preferably 600 to 1,300° C., particularly preferably 800 to 1,200° C. The heat treatment time is in a range of 10 to 600 minutes, preferably 30 to 180 minutes. The annealing atmosphere preferably comprises $N_2$, Ar, He, or $N_2$ containing 0.1% or less of $O_2$.

The insulating layer formed on the luminescent layer preferably has a resistivity of $10^8$ Ω·cm or more, particularly preferably $10^{10}$ to $10^{18}$ Ω·cm. Further, it is preferably made of materials having a relatively high dielectric constant. The dielectric constant $\epsilon$ is preferably 3 to 1,000.

The insulating layer may be formed of materials such as silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), zirconia ($ZrO_2$), silicon hydroxynitride (SiON), alumina ($Al_2O_3$) and lead niobate ($PbNb_2O_6$).

The insulating layer is formed of these materials in the same manner as the above luminescent layer is formed.

In this case, the thickness of the insulating layer is preferably 50 to 1,000 nm, particularly preferably 100 to 500 nm.

The production process of the composite substrate and the thin-film EL device of the present invention will be described with reference to the accompanying drawings hereinafter.

First, as shown in FIG. 1, insulating layer (dielectric layer) green sheets are laminated on a film sheet 11 having a flat surface to form an insulating layer (dielectric layer) precursor 3.

Figure 2:
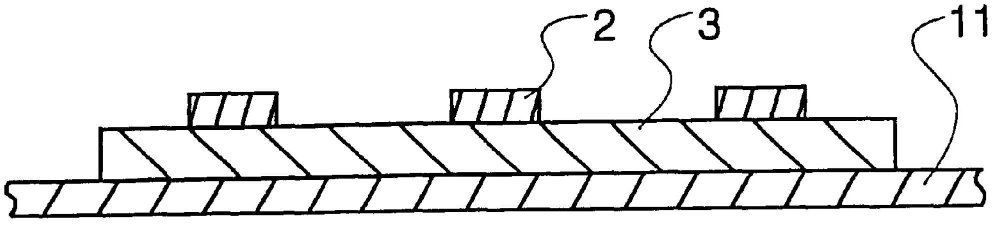
FIG. 2 is an illustration of a partial section of the production process of the thin-film EL device of the present invention.

Then, as shown in FIG. 2, an electrode layer paste (electrode layer precursor) 2 is printed thereon in a predetermined pattern.

Figure 3:
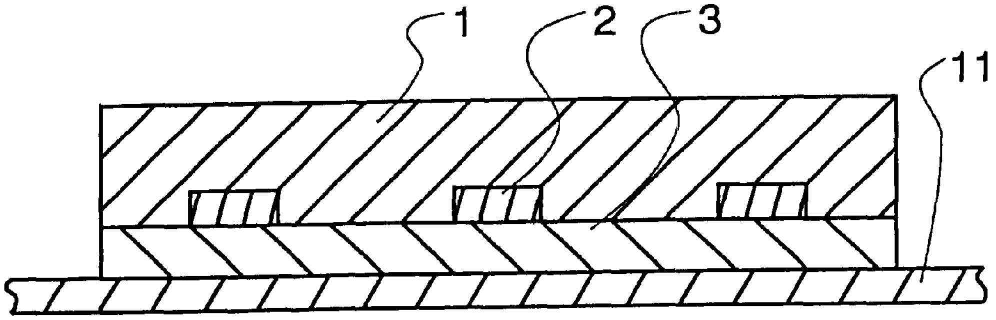
FIG. 3 is an illustration of a partial section of the production process of the thin-film EL device of the present invention.

Then, as shown in FIG. 3, a substrate green sheet 1 is laminated to a required thickness to form a substrate precursor. Thus, a composite layer precursor is obtained.

Figure 4:
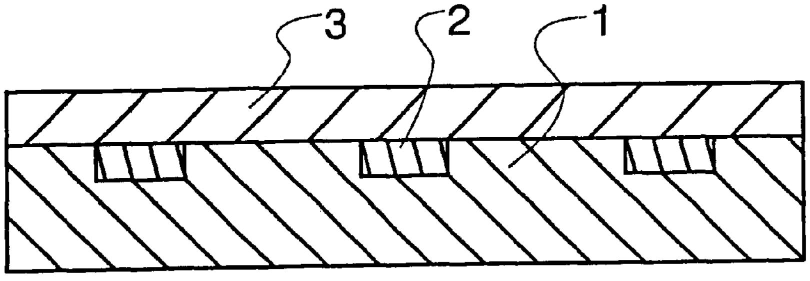
FIG. 4 is an illustration of a partial section of the production process of the thin-film EL device of the present invention.

Thereafter, as shown in FIG. 4, the film sheet 11 is peeled from the obtained composite substrate precursor, which is then flipped as required and subjected to a binder-removing treatment and the sintering. The binder-removing treatment and the sintering are carried out under the conditions described above, and annealing may also be carried out.

The obtained composite substrate precursor may be subjected to the sintering with the film sheet when it is a cellulose-containing sheet such as paper.

After the sintering, a composite substrate is obtained. Further, a thin-film EL device is obtained in the following manner.

Figure 5:
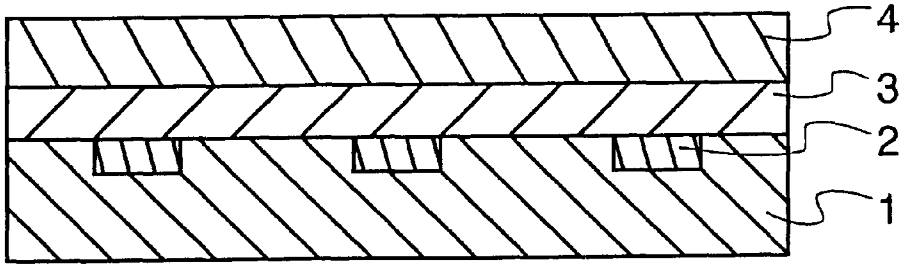
FIG. 5 is an illustration of a partial section of the production process of the thin-film EL device of the present invention.

First, as shown in FIG. 5, a luminescent layer 4 is formed on the composite substrate. As described above, the luminescent layer 4 can be formed by electron-beam deposition.

Figure 6:
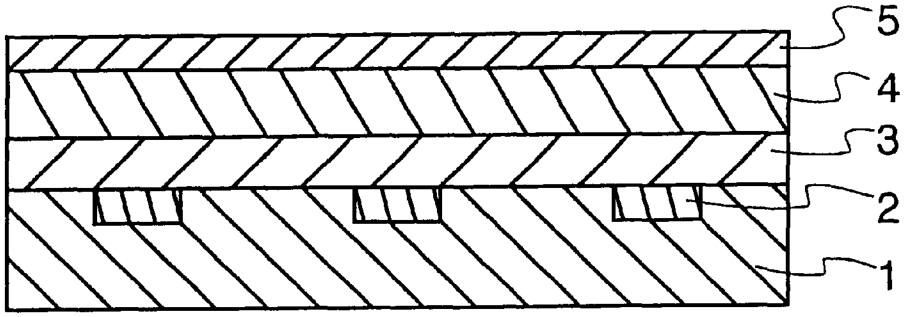
FIG. 6 is an illustration of a partial section of the production process of the thin-film EL device of the present invention.

Then, as shown in FIG. 6, an upper insulating layer is formed on the luminescent layer 4, and as required, the substrate 1 on which the insulating layer 5 has been formed is subjected to heat treatment. The heat treatment may be carried out after the formation of the luminescent layer 4 or after the formation of an upper electrode layer 6, etc. on the upper insulating layer 5.

Figure 7:
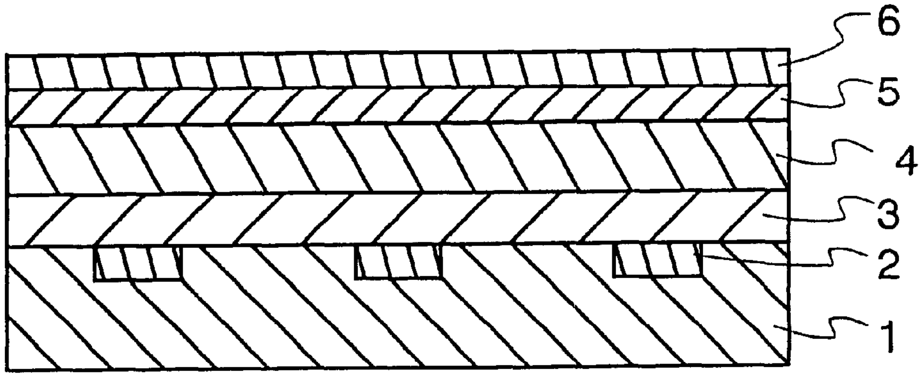
FIG. 7 is an illustration of a partial section of the production process of the thin-film EL device of the present invention.
Figure 8:
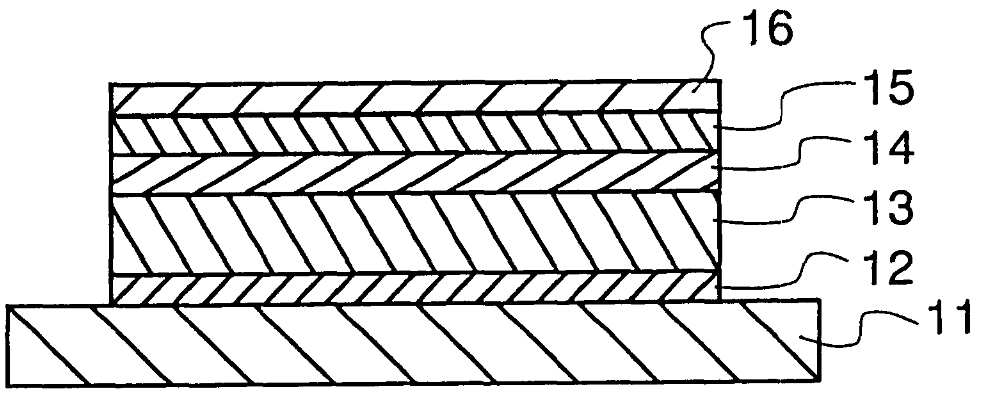
FIG. 8 is an illustration of a partial section of the structure of the conventional thin-film EL device.
Figure 9:
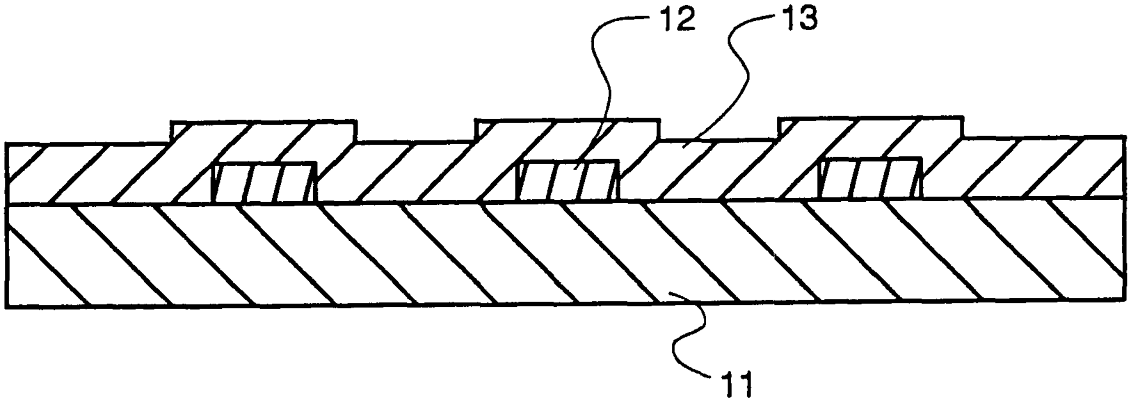
FIG. 9 is an illustration of a partial section of the structure of the conventional thin-film EL device.

Thereafter, as shown in FIG. 7, an upper electrode layer 6 is formed on the upper insulating layer 5. When the upper electrode layer 6 is formed after the heat treatment, it is not limited to heat-resistant materials, and there may be used a transparent conductive film which is the most favorable in recovering light. Further, the electrode layer may be a metal film whose thickness is adjusted as required to improve its light transmittance.

Although the above example shows the case where only one luminescent layer is present, the thin-film EL layer is not limited to the constitution. A plurality of luminescent layers may be laminated in a film-thickness direction, or a plurality of luminescent layers (pixels) of different types may be put together in the form of a matrix and placed in a plane.

The thin-film EL device of the present invention may also be used in a high-performance, high-definition display because the use of the substrate material obtained by the sintering makes it easy to obtain a luminescent layer capable of high-intensity blue emission and because the insulating layer on which the luminescent layer is laminated has a flat surface. Further, it can be produced by a relatively simple process at a low production cost. Furthermore, since it is capable of high-efficiency, high-intensity blue emission, it may be used in combination with a color filter to form a white emission device.

As the color filter, a color filter used in an LCD, etc. may be used. The attributes of the color filter may be adjusted according to light emitted by the EL device to optimize light recovery and color purity.

In addition, when a color filter capable of shielding short-wave external light which is likely to be absorbed by EL device materials and a fluorescent conversion layer is used, the light resistance and display contrast of the EL device can be improved.

An optical thin film such as a dielectric multilayer film may be substituted for the color filter.

A fluorescent conversion filter film is used to change the color of emission by absorbing the light from the EL device and discharging the light from the fluorescent material contained in the fluorescent conversion filter film. It comprises a binder, fluorescent materials and light-absorbing materials.

As the fluorescent materials, those having a high fluorescent quantum yield are basically used, and those having high absorptivity in an EL emission wave rage are desirable. From a practical point of view, a dye laser is suitable, and rhodamine-based compounds, perylene-based compounds, cyanine-based compounds, phthalocyanine-based compounds (including subphthalocyanine), naphthaloimide-based compounds, condensed ring hydrocarbon-based compounds, condensed heterocyclic compounds, styryl-based compounds and coumarin-based compounds may be used.

The binder is basically formed of materials which do not cause quenching and is preferably one that makes fine patterning by photolithography or printing possible.

The light-absorbing materials are used only when the light absorption of the fluorescent materials used is not sufficient. The light-absorbing materials are selected from those which do not cause quenching.

The thin-film EL device of the present invention is generally pulse-driven or alternating-current-driven, and the impressed voltage is 50 to 300 V.

Incidentally, although the thin-film EL device has been described in the above example as one of the applications of the composite substrate, the composite substrate of the present invention is not limited to the application and is applicable to a variety of electric materials. For example, it is applicable to a thin film/thick-film hybrid high frequency coil device, etc.

The present invention will now further be described by reference to certain examples and comparative examples. These examples are provided solely for purposes of illustration and are not intended to be limitative.

EXAMPLES

Examples of the present invention will be described hereinafter. The EL structures used in the following examples are such that a luminescent layer, an upper insulating layer and an upper electrode are laminated successively on the surface of the insulating layer of the composite substrate using thin-film processes.

Example 1

A dielectric paste was prepared by mixing barium titanate powder with a binder (acryl resin) and a solvent (terpineol) to prepare a dielectric layer precursor. A dielectric layer green sheet was formed on a PET film having a flat surface by a doctor blade using the paste. A plurality of the green sheet were laminated to a predetermined thickness.

Then, an electrode layer paste prepared by mixing palladium powder with a binder (ethyl cellulose) and a solvent (terpineol) was printed on the green sheet laminate in a striped manner. A substrate precursor was prepared by preparing a paste by mixing alumina powder with a binder to form substrate green sheets, which were then laminated. Another substrate precursor was prepared by using a paste having the same composition as that of the dielectric paste. A composite substrate green was prepared by laminating the substrate precursor on the dielectric layer precursor having the electrode layer printed thereon. The prepared composite substrate green was subjected to a binder-removing treatment in the air at 260° C. for 8 hours, and then to the sintering in the air at 1,340° C. for 2 hours. The dielectric layer and the substrate of the prepared composite substrate had thicknesses of about 30 $\mu$m and about 1.5 mm, respectively.

An EL device was produced by forming a ZnS fluorescence material-based thin film having a thickness of 0.7 $\mu$m on the composite substrate heated at 250° C. by sputtering using a Mn-doped ZnS target, heating the resulting composite substrate in a vacuum at 600° C. for 10 minutes, and forming $Si_3N_4$ thin film as a second insulating layer and an ITO thin film as a second electrode on the composite substrate successively by sputtering.

Emission properties were measured by taking out the printed and sintered electrode and the ITO transparent electrode from the obtained device structure and applying a 50 $\mu$s electric field with a pulse width of 1 kHz to the electrodes. Further, to measure the electrical characteristics of the dielectric layer, another sample was prepared by printing another electrode pattern in the form of a stripe on the dielectric layer of the above composite substrate such that one of the electrode patterns was cross the other electrode pattern at right angles, drying the formed electrode pattern and sintering the resulting composite substrate.

The electrical characteristics of the dielectric layer of the composite substrate prepared as described above and the emission properties of the electroluminescent device 0.5 prepared using the composite substrate are shown in Table 1.

Example 2

A composite substrate and an electroluminescent device prepared using the composite substrate were prepared in the same manner as in Example 1 except that in preparing the dielectric precursor of Example 1, $BaTiO_3$ was mixed with the predetermined amounts of MnO, MgO and $V_2O_5$ in water before mixed with a binder. The emission properties obtained are shown in Table 1.

Example 3

A composite substrate and an electroluminescent device prepared using the composite substrate were prepared in the same manner as in Example 1 except that the dielectric of Example 2 containing $Y_2O_3$ was used. The emission properties obtained are shown in Table 1.

Example 4

A composite substrate and an electroluminescent device prepared using the composite substrate were prepared in the same manner as in Example 1 except that the dielectric of Example 3 containing (Ba 0.5, Ca 0.5) $SiO_3$ was used. The emission properties obtained are shown in Table 1.

electroluminescent device prepared using the composite substrate were prepared in the same manner as in Example 1. The emission properties obtained are shown in Table 1.

Example 7

A composite substrate and an electroluminescent device prepared using the composite substrate were prepared in the same manner as in Example 1 except that the dielectric precursor and the electrode layer paste of Example 4 and a paste having the same composition as that of the dielectric precursor paste were used to prepare a substrate precursor. The emission properties obtained are shown in Table 1.

TABLE 1

| | Substrate material | Lower electrode | Dielectric layer | Additives | Sintering conditions | Dielectric layer thickness ($\mu$m) |
|---|---|---|---|---|---|---|
| Ex. 1 | $Al_2O_3$ | Pd | $BaTiO_3$ thick film | None | 1,340° C., in air | 30 |
| Ex. 2 | $Al_2O_3$ | Pd | $BaTiO_3$ thick film | MnO, MgO, $V_2O_5$ | 1,340° C., in air | 25 |
| Ex. 3 | $Al_2O_3$ | Pd | $BaTiO_3$ thick film | Ex. 2 + $Y_2O_3$ | 1,340° C., in air | 29 |
| Ex. 4 | $Al_2O_3$ | Pd | $BaTiO_3$ thick film | Ex. 3 + (Ba, Ca) $SiO_3$ | 1,340° C., in air | 31 |
| Ex. 5 | $Al_2O_3$ | Ni | $BaTiO_3$ thick film | Same as in Ex. 4 | 1,340° C., in reducing atmosphere | 32 |
| Ex. 6 | same as dielectric layer | Pd | $BaTiO_3$ thick film | Same as in Ex. 4 | 1,340° C., in air | 28 |
| Comp. Ex. 1 | blue plate glass | Al | $Y_2O_3$ thin film | — | — | 0.6 |
| Comp. Ex. 2 | Blue plate glass | Al | $Si_3N_4$ thin film | — | — | 0.6 |

| | Relative dielectric constant | tan δ (%) | Dielectric strength (V/$\mu$m) | Heat treatment temperature of fluorescent layer (° C.) | Emission initiating voltage (V) | Brightness at the time of application of 210 V |
|---|---|---|---|---|---|---|
| Ex. 1 | 2,420 | 3.1 | 15 | 600 | 105 | 1,030 |
| Ex. 2 | 2,310 | 1.4 | 30 | 600 | 145 | 1,050 |
| Ex. 3 | 2.050 | 1.5 | 40 | 600 | 140 | 1,300 |
| Ex. 4 | 2,260 | 1.2 | 45 | 600 | 120 | 1,250 |
| Ex. 5 | 2,320 | 1.3 | 50 | 600 | 135 | 1,350 |
| Ex. 6 | 2,670 | 0.8 | 65 | 600 | 130 | 1,470 |
| Comp. Ex. 1 | 12 | 1.1 | 370 | — | 186 | 150 |
| Comp. Ex. 2 | 8 | 1.0 | 720 | — | 192 | 60 |

Example 5

A composite substrate and an electroluminescent device prepared using the composite substrate were prepared in the same manner as in Example 1 except that the dielectric of Example 3 containing (Ba 0.4, Ca 0.6)SiO3 was used. The emission properties obtained are shown in Table 1.

Example 6

An electrode layer paste was prepared using the dielectric and the substrate precursor of Example 4 and Ni powder in place of Pd powder. Sintering was carried out in the atmosphere comprising $N_2$, 5% of $H_2$, and $H_2O$ gas obtained by vapor pressure at 35° C. An oxygen partial pressure of $10^{-8}$ Torr was used. After the sintering, re-oxidization was carried out at 1,050° C. for 3 hours in the atmosphere comprising $N_2$ and $H_2O$ gas obtained by vapor pressure at 35° C. The oxygen partial pressure used in the re-oxidization was also $10^{-8}$ Torr. Except for these, a composite substrate and an As described above, in accordance with the present invention, there is provided a composite substrate in which the surface of the insulating layer is not influenced by the electrode layer and which requires neither a grinding process nor a sol-gel process, is easy to produce and can provide a thin-film EL device having a high display quality when used therein; a thin-film EL device using the substrate; and a production process for the device.

Having now described the present invention, it will be readily apparent to one of ordinary skill in the art that many changes and modifications may be made to the above-described embodiments without departing from the spirit and the scope of the present invention.

What is claimed is:

1. A composite substrate, comprising a substrate; an electrode layer embedded in the substrate in such a manner that the electrode layer and the substrate are in one plane; and an insulating layer formed on the surface of a composite of the substrate and the electrode layer.

2. The composite substrate according to claim 1, wherein the insulating layer comprises a dielectric having a dielectric constant of 1000 or more.

3. The composite substrate according to claim 1, wherein the insulating layer contains barium titanate as a main component.

4. The composite substrate according to claim 3, wherein the insulating layer further contains, as a secondary component, at least one selected from the group consisting of magnesium oxide, manganese oxide, tungsten oxide, calcium oxide, zirconium oxide, niobium oxide, cobalt oxide, yttrium oxide and barium oxide.

5. The composite substrate according to claim 3, wherein the insulating layer contains, as a secondary component, at least one selected from the group consisting of $SiO_2$, MO, $Li_2O$ and $B_2O_3$, wherein M is at least one element selected from the group consisting of Mg, Ca, Sr, and Ba.

6. The composite substrate according to claim 1, wherein the insulating layer contains barium titanate as a main component and at least one secondary component selected from the group consisting of magnesium oxide, manganese oxide, yttrium oxide, barium oxide and calcium oxide, and silicon oxide as secondary components; and wherein the content of magnesium oxide in terms of MgO is 0.1 to 3 moles, that of manganese oxide in terms of MnO is 0.05 to 1.0 mole, that of yttrium oxide in terms of $Y_2O_3$ is not more than 1 mole, that of barium oxide in terms of BaO and calcium oxide in terms of CaO is 2 to 12 moles, and that of silicon oxide in terms of $SiO_2$ is 2 to 12 moles, based on 100 moles of barium titanate in terms of $BaTiO_3$.

7. The composite substrate according to claim 3, wherein the total content of BaO, CaO and $SiO_2$ in terms of $(Ba_xCa_{1-x}\ O)_y{\cdot}SiO_2$ is 1 to 10 wt % based on the total content of $BaTiO_3$, MgO, MnO and $Y_2O_3$, wherein x satisfies $0.3 \leqq x \leqq 0.7$, and y satisfies $0.95 \leqq y \leqq 1.05$.

8. The composite substrate according to claim 1, which is a thick film obtained by sintering the laminate formed by the use of a sheet-forming process or a print process.

9. The composite substrate according to claim 1, which is obtained by forming a functional film on the insulating layer, and then heating the functional film at a temperature of from 600° C. to a sintering temperature of the substrate or less.

10. The composite substrate according to claim 1, wherein the substrate and the insulating layer each comprise the same composition.

11. The composite substrate according to claim 9, wherein said functional film is from 800° C. to 1,500° C.

12. The composite substrate according to claim 1, wherein said substrate comprises a glass material in a range of about 20 to 30 wt. % based on the substrate material.

13. The composite substrate according to claim 1, wherein said substrate has a thickness of from about 1 to 5 mm.

14. The composite substrate according to claim 1, wherein said electrode layer contains a glass frit as an underlayer thereof, thereby increasing adhesion of the electrode layer to the substrate.

15. The composite substrate according to claim 1, wherein the insulating layer comprises composite titanium oxides, titanium-based composite oxides, and mixtures thereof.

16. The composite substrate according to claim 1, wherein the insulating layer has a thickness of 100 $\mu$m or less.

17. The composite substrate according to claim 16, wherein the insulating layer has a thickness of 2 to 20 $\mu$m.

18. A thin film EL device, comprising the composite substrate in claim 1, and a luminescent layer, another insulating layer and another electrode layer formed successively on the composite substrate.

19. The thin film EL device according to claim 18, wherein the electrode layer comprises at least one element selected from the group consisting of Ag, Au, Pd, Pt, Cu, Ni, W, Mo, Fe and Co, at least one alloy selected from the group consisting of Ag—Pd, Ni—Mn, Ni—Cr, Ni—Co and NiAl alloys.

20. The composite substrate according to claim 13, wherein the substrate has a thickness of from about 1 to 3 $\mu$m.

21. The composite substrate according to claim 1, wherein said electrode has a thickness of from about 0.5 to 5 $\mu$m.

22. The composite substrate according to claim 21, wherein said electrode has a thickness of from about 1 to 3 $\mu$m.

23. The composite substrate according to claim 1, wherein said substrate comprises alumina.

24. The composite substrate according to claim 1, wherein said substrate comprises beryllia, aluminum nitride or silicon carbonate.

25. The composite substrate according to claim 1, wherein said electrode layer embedded in the substrate comprises Ni or Pd.

26. The composite substrate according to claim 1, wherein the insulating layer formed on the surface of the composite of the substrate and the electrode layer comprises a film of $BaTiO_3$, as a dielectric layer.

* * * * *